United States Patent
Aramaki

(10) Patent No.: US 9,733,070 B2
(45) Date of Patent: Aug. 15, 2017

(54) SHAPE MEASURING APPARATUS, STRUCTURE MANUFACTURING SYSTEM, STAGE APPARATUS, SHAPE MEASURING METHOD, STRUCTURE MANUFACTURING METHOD, PROGRAM, AND RECORDING MEDIUM

(71) Applicant: NIKON CORPORATION, Tokyo (JP)

(72) Inventor: Toru Aramaki, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 140 days.

(21) Appl. No.: 14/724,002

(22) Filed: May 28, 2015

(65) Prior Publication Data
US 2015/0260507 A1    Sep. 17, 2015

Related U.S. Application Data

(63) Continuation of application No. PCT/JP2013/081476, filed on Nov. 22, 2013.

(30) Foreign Application Priority Data

Nov. 29, 2012  (JP) .................................. 2012-261325

(51) Int. Cl.
*G01B 11/30* (2006.01)
*G01B 11/24* (2006.01)
*G05B 19/401* (2006.01)

(52) U.S. Cl.
CPC ............ *G01B 11/24* (2013.01); *G05B 19/401* (2013.01); *G05B 2219/37577* (2013.01)

(58) Field of Classification Search
CPC ...... G06Q 10/06; G06Q 17/50; G06Q 10/087; G05B 19/41865; G05B 19/4097
(Continued)

(56) References Cited

U.S. PATENT DOCUMENTS 6,075,605 A    6/2000   Futamura et al.
2007/0247639 A1*  10/2007   Amstel ................ G01B 11/026
                                                    356/601

(Continued)

FOREIGN PATENT DOCUMENTS

JP    3-225206    10/1991
JP    3-264804    11/1991

(Continued)

OTHER PUBLICATIONS

English-language Written Opinion of the International Searching Authority issued by the Japanese Patent Office in International Application No. PCT/JP2013/091476, mailed Feb. 25, 2014 (12 pages).

(Continued)

*Primary Examiner* — Tarifur Chowdhury
*Assistant Examiner* — Md M Rahman
(74) *Attorney, Agent, or Firm* — Finnegan, Henderson, Farabow, Garrett & Dunner, LLP

(57) ABSTRACT

Provided is a shape measuring apparatus that is capable of suppressing adverse effects on measurement accuracy. A probe is provided with an illumination optical system that irradiates an object with light and an image capturing device that detects light reflected by the object. A rotation mechanism that rotates the probe is disposed at a position distanced from a rotation axis line. Attitude of the probe) relative to the object can be changed in accordance with the rotation of the probe. Signals detected by the image capturing device are calculated by a shape information acquisition unit.

24 Claims, 14 Drawing Sheets

(58) Field of Classification Search
USPC .......................................... 700/97; 356/610
See application file for complete search history.

(56) References Cited

U.S. PATENT DOCUMENTS

| | | | |
|---|---|---|---|
| 2008/0077259 A1* | 3/2008 | Furumoto | ............... G06F 17/50 700/90 |
| 2010/0298705 A1* | 11/2010 | Pelissier | .................. A61B 5/06 600/443 |
| 2011/0270562 A1 | 11/2011 | Ito et al. | |
| 2012/0017453 A1* | 1/2012 | Ogihara | ............... G01B 21/045 33/503 |
| 2012/0194651 A1 | 8/2012 | Kanto et al. | |

FOREIGN PATENT DOCUMENTS

| | | | | |
|---|---|---|---|---|
| JP | 4-278407 | 10/1992 | | |
| JP | 7-248213 | 9/1995 | | |
| JP | EP 1382934 A2 * | 1/2004 | ............... | G01B 5/28 |
| JP | 2010169633 A * | 8/2010 | ............... | G01B 5/28 |
| JP | 2011-232104 | 11/2011 | | |
| JP | 2012-093235 | 5/2012 | | |

OTHER PUBLICATIONS

English-language International Search Report issued by the Japanese Patent Office in International Application No. PCT/JP2013/081476, mailed Feb. 25, 2014 (6 pages).

\* cited by examiner

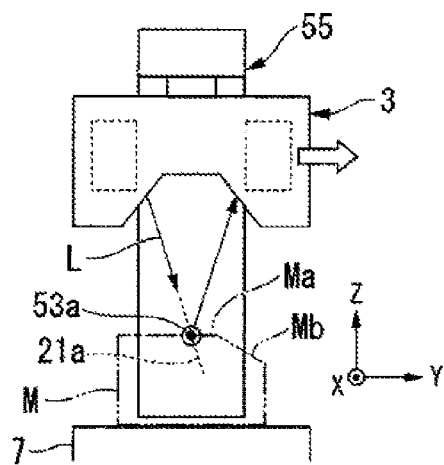 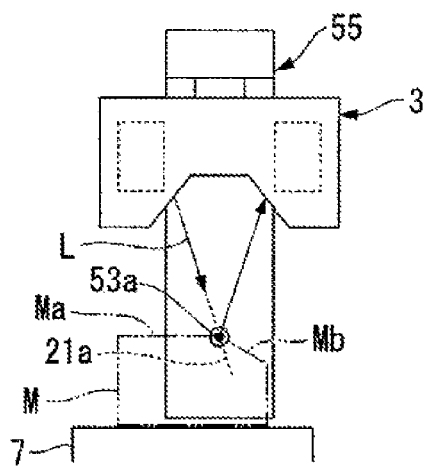
FIG. 6A  FIG. 6B
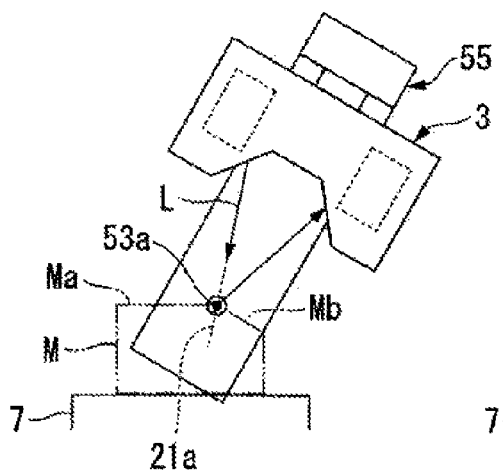 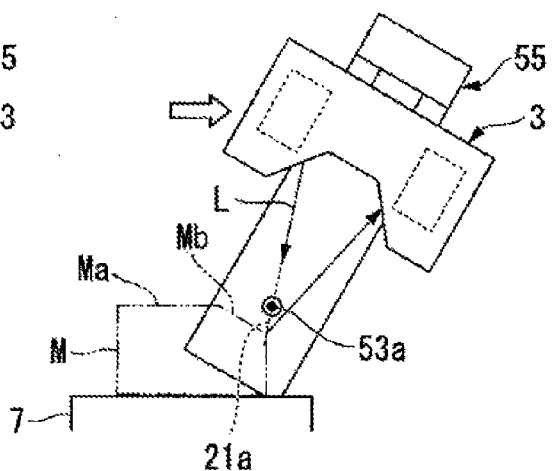
FIG. 6C  FIG. 6D

SHAPE MEASURING APPARATUS, STRUCTURE MANUFACTURING SYSTEM, STAGE APPARATUS, SHAPE MEASURING METHOD, STRUCTURE MANUFACTURING METHOD, PROGRAM, AND RECORDING MEDIUM

CROSS-REFERENCE TO RELATED APPLICATIONS

This is a Continuation Application of International Application No. PCT/JP2013/081476 filed on Nov. 22, 2013 which claims priority to Japanese Patent Application No. 2012-261325 filed on Nov. 29, 2012. The contents of the aforementioned applications are incorporated herein by reference in their entirety.

BACKGROUND

The present invention relates to shape measuring apparatuses and structure manufacturing systems, as well as to structure manufacturing methods.

Shape measurement techniques using a method such as the light-section method are used to measure the shape of a subject such as an industrial product. In such a shape measurement technique, for example, an imaging element captures an image of a surface of a subject that has been irradiated with light and measures a shape of the subject on the basis of the result thereof. See US Patent Application Publication No. 2012/0194651, for example.

SUMMARY

However, there are cases where the attitude of a probe is changed in accordance with the shape of the subject. The attitude of the probe relative to an observation position for the subject has thus far been adjusted to an optimal attitude by changing at least one of an attitude of the subject and the attitude of the probe. In such a case, operations for aligning the probe and the subject may become complicated.

The present invention has been made in light of the foregoing circumstances, and an object of the present invention is to provide a shape measuring apparatus, a structure manufacturing system, a stage apparatus, a shape measuring method, a structure manufacturing method, a program, and a recording medium that make it easy to align a probe and a subject.

According to a first aspect of the present invention, provided is a shape measuring apparatus that measures a shape of a subject. The shape measuring apparatus is provided with: a probe including an irradiating optical system that irradiates the subject with light and an imaging element that detects light with which the subject is irradiated and which is reflected by the subject; a rotation mechanism that rotates the probe around the subject; a holding section disposed at a distance from a rotation axis of the rotation mechanism, the holding section holding the probe and changing an attitude of the probe relative to the subject in accordance with the rotation of the probe; and a calculating unit that calculates shape information of the subject using a signal detected by the imaging element.

According to a second aspect of the present invention, provided is a structure manufacturing system that is provided with: a forming apparatus that forms a structure on the basis of design information regarding a shape of the structure; the shape measuring apparatus described in the first aspect that measures the shape of the structure formed by the forming apparatus; and a control apparatus that compares shape information indicating the shape of the structure measured by the shape measuring apparatus with the design information.

According to a third aspect of the present invention, provided is a stage apparatus used in a shape measuring apparatus that measures a shape of a subject. The stage apparatus is provided with: a rotation mechanism that causes a probe to rotate around the subject, the probe including an irradiating optical system that irradiates the subject with light and an imaging element that detects light with which the subject is irradiated and which is reflected by the subject; and a holding section disposed at a distance from a rotation axis of the rotation mechanism, the holding section holding the probe and changing an attitude of the probe relative to the subject in accordance with the rotation of the probe.

According to a fourth aspect of the present invention, provided is a shape measuring method of measuring a shape of a subject. The shape measuring method includes the steps of: irradiating the subject with light from a probe that includes an irradiating optical system that irradiates the subject with light and an imaging element that detects light with which the subject is irradiated and which is reflected by the subject, receiving the light reflected by the subject using the imaging element, and detecting a signal from the imaging element; and changing an attitude of the probe relative to the specimen in accordance with the rotation of the probe, the probe being disposed at a position distanced from a rotation axis on which the probe is rotated around the subject.

According to a fifth aspect of the present invention, provided is a structure manufacturing method that includes the steps of: forming a structure on the basis of design information regarding a shape of the structure; measuring the shape of the formed structure using the shape measuring apparatus described in the first aspect; and comparing shape information indicating the shape of the structure measured by the shape measuring apparatus with the design information.

According to a sixth aspect of the present invention, provided is a program product that causes a computer to execute a method that includes the steps of: rotating a probe around a subject with the prove distanced from a rotation axis of the probe, the probe including an irradiating optical system that irradiates the subject with light and an imaging element that detects light with which the subject is irradiated and which is reflected by the subject; detecting a signal from the imaging element using the probe; and acquiring shape information of the subject using the detected signal.

According to a seventh aspect of the present invention, provided is a computer-readable recording medium having the program described in the sixth aspect stored therein.

According to the present invention, a probe and a subject can be aligned with ease even in the case where shape information is measured by rotating the probe.

BRIEF DESCRIPTION OF DRAWINGS

FIGS. 6A to 6D are diagrams illustrating an example of measurement operations of the shape measuring apparatus according to the first embodiment.

DESCRIPTION OF EMBODIMENTS

Hereinafter, embodiments of a shape measuring apparatus, a structure manufacturing system, a stage apparatus, a shape measuring method, a structure manufacturing method, a program, and a recording medium according to the present invention will be described with reference to FIGS. 1 to 15.

In the following description, an XYZ orthogonal coordinate system is established, and the positional relationship of respective members is described with reference to the XYZ rectangular coordinate system. A Z-axis direction is set to a vertical direction, for example, and an X-axis direction and a Y-axis direction are set to directions that are parallel to a horizontal direction and orthogonal to each other, for example. Meanwhile, rotation (tilt) directions around the X-axis, the Y-axis, and the Z-axis are indicated by θX, θY, and θZ directions, respectively.

First Embodiment

Figure 1:
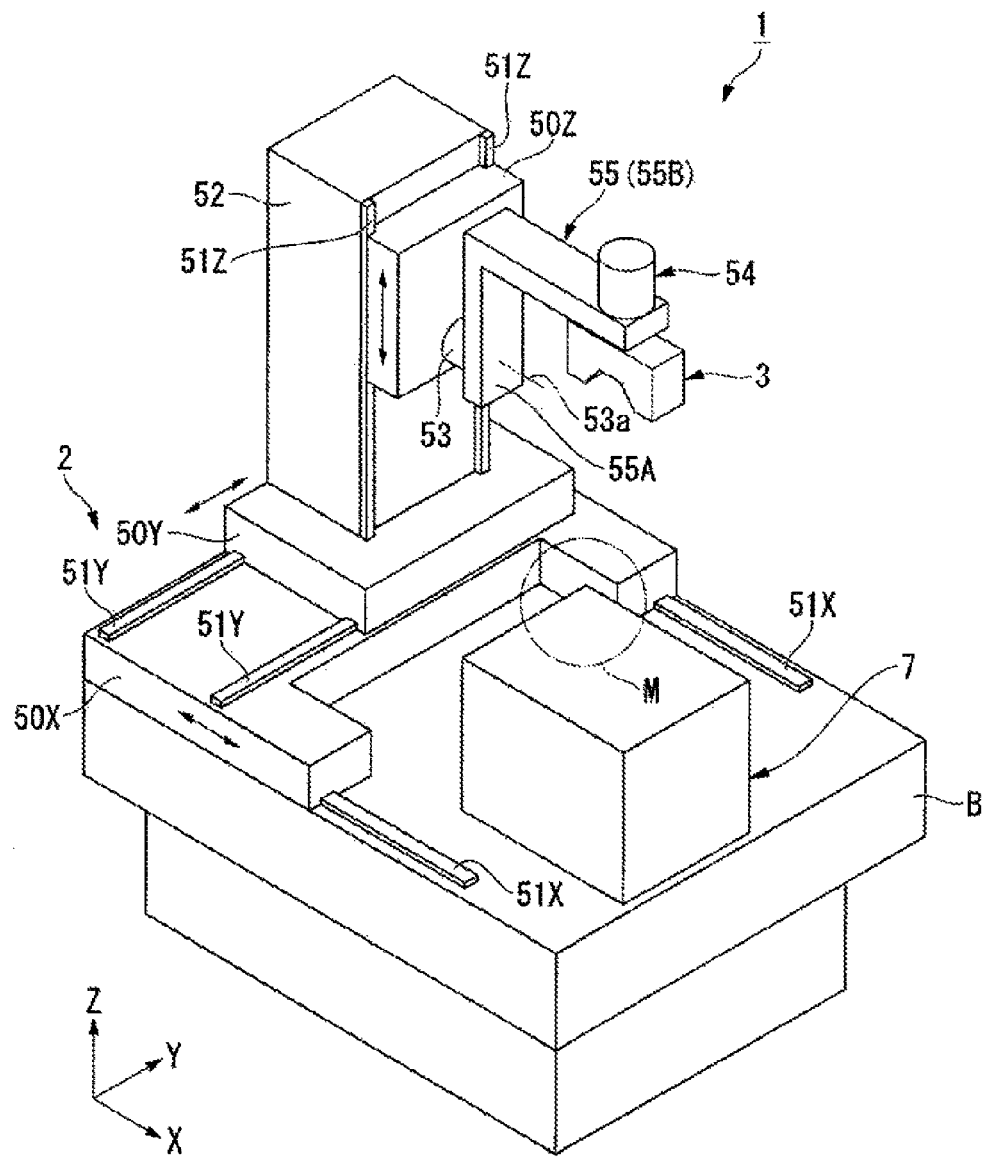
FIG. 1 is a perspective view of a shape measuring apparatus according to a first embodiment.
Figure 2:
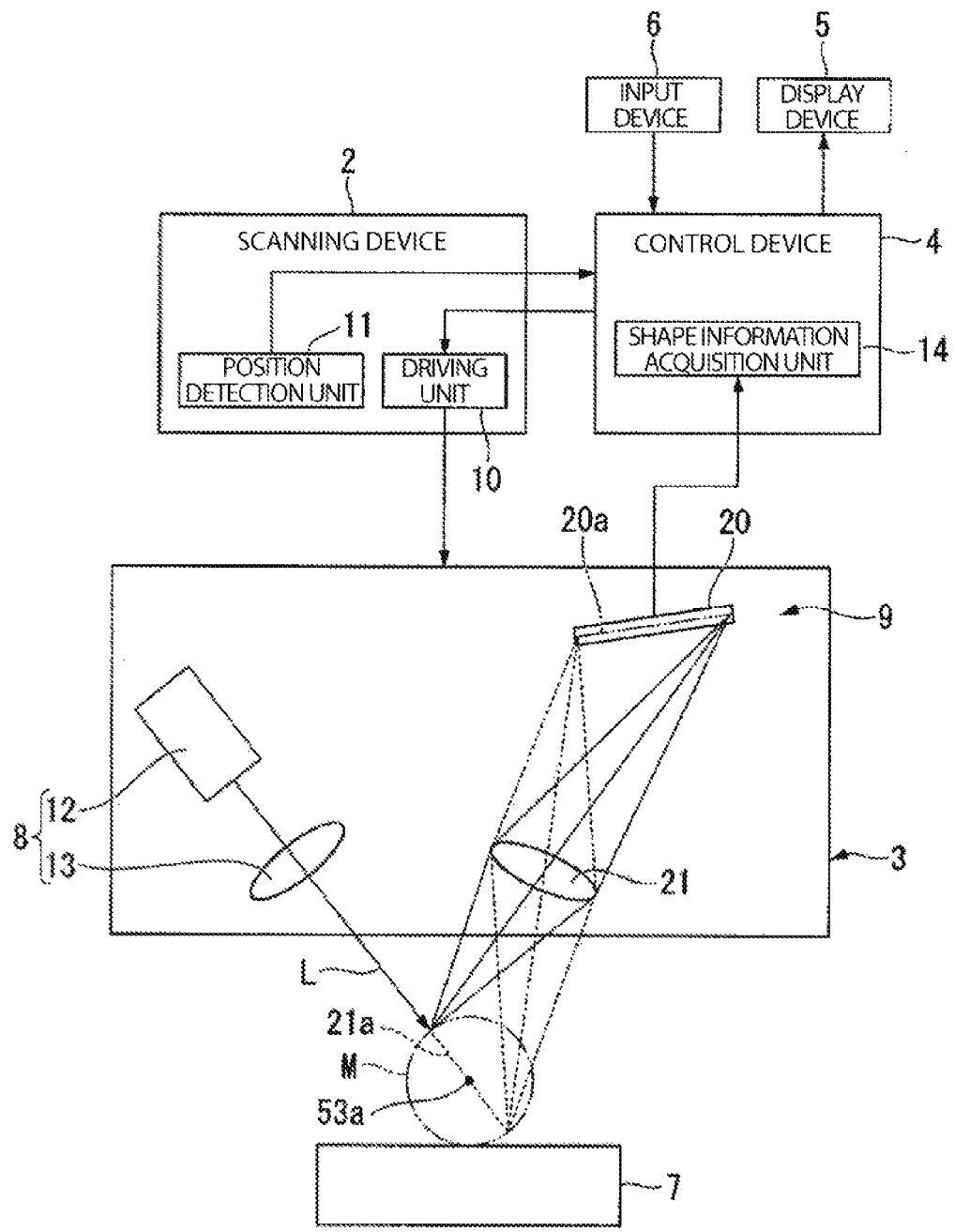
FIG. 2 is a schematic view of the configuration of the shape measuring apparatus according to the first embodiment.
Figure 3:
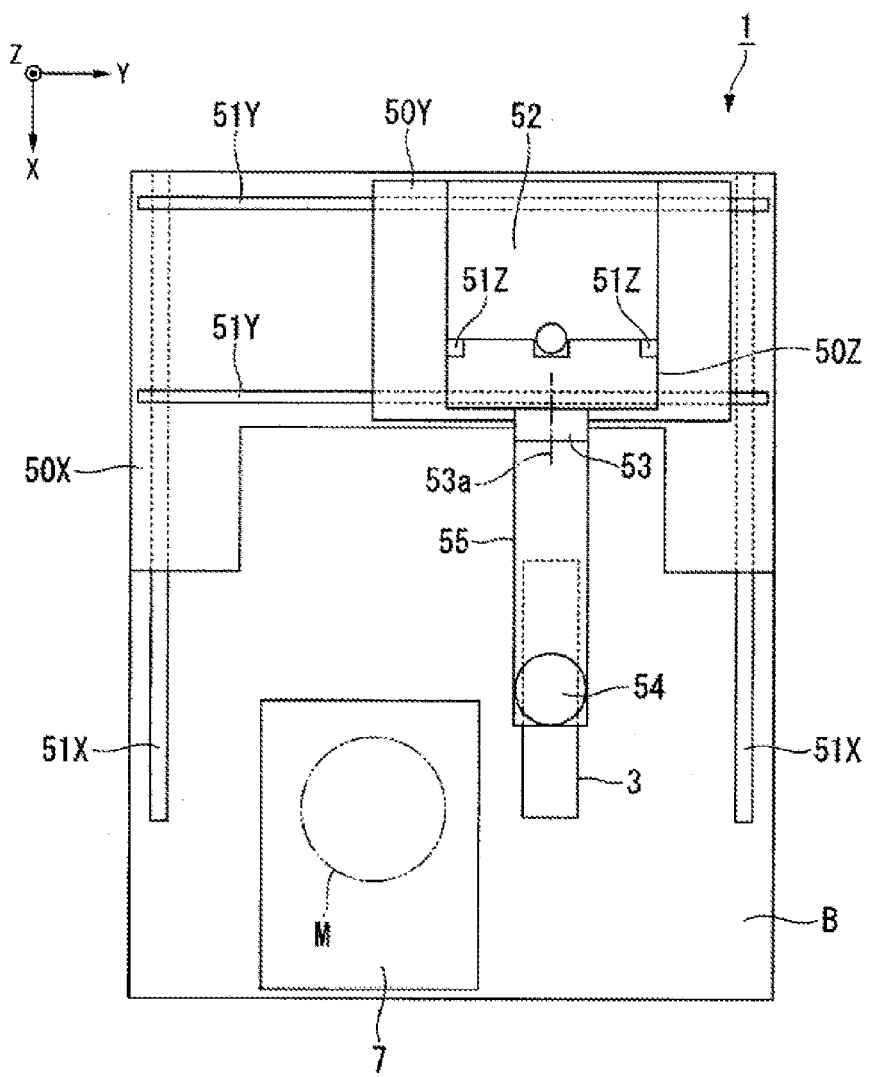
FIG. 3 is a top view of the shape measuring apparatus according to the first embodiment.
Figure 4:
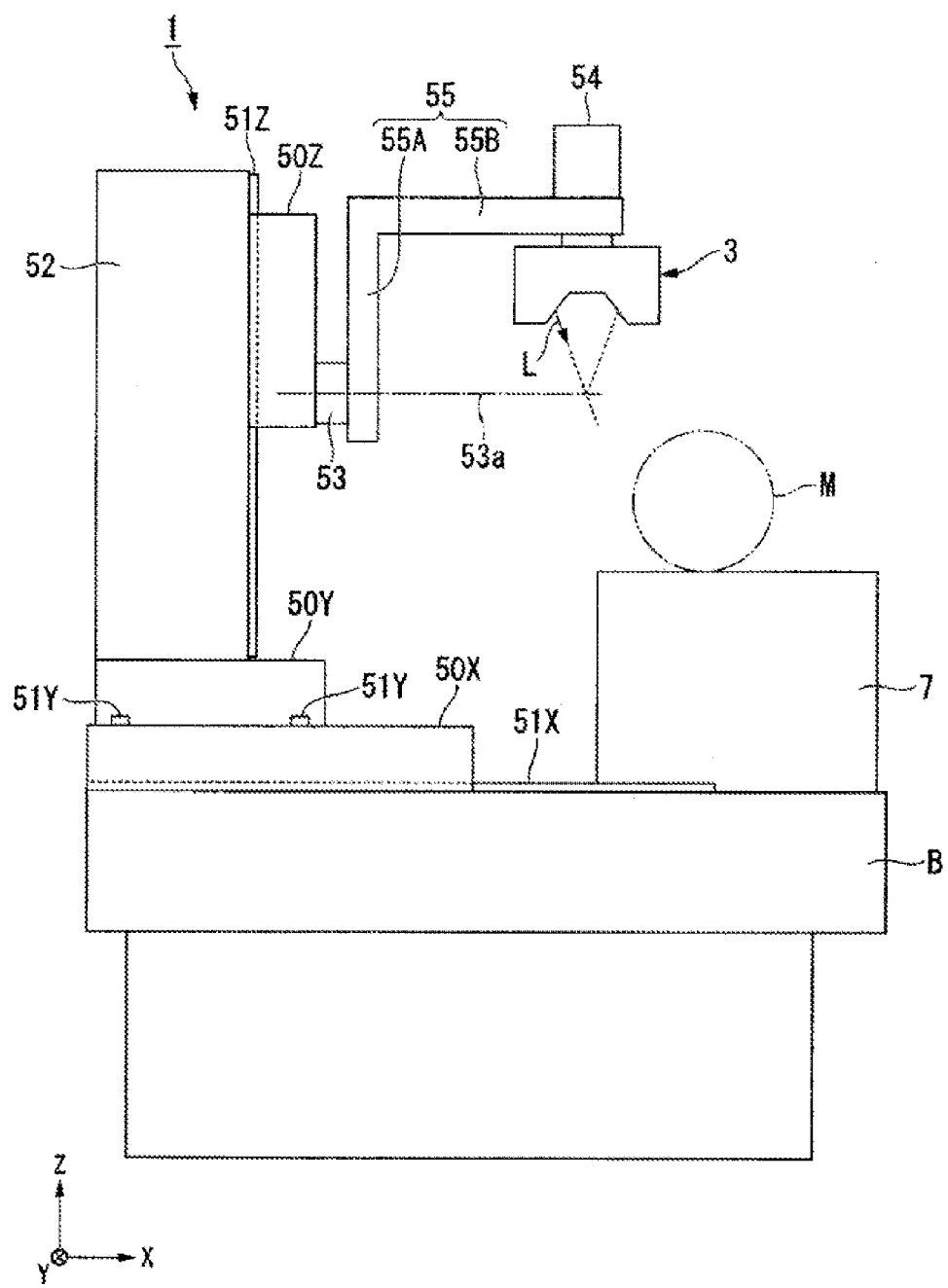
FIG. 4 is a side view of the shape measuring apparatus according to the first embodiment.
Figure 5:
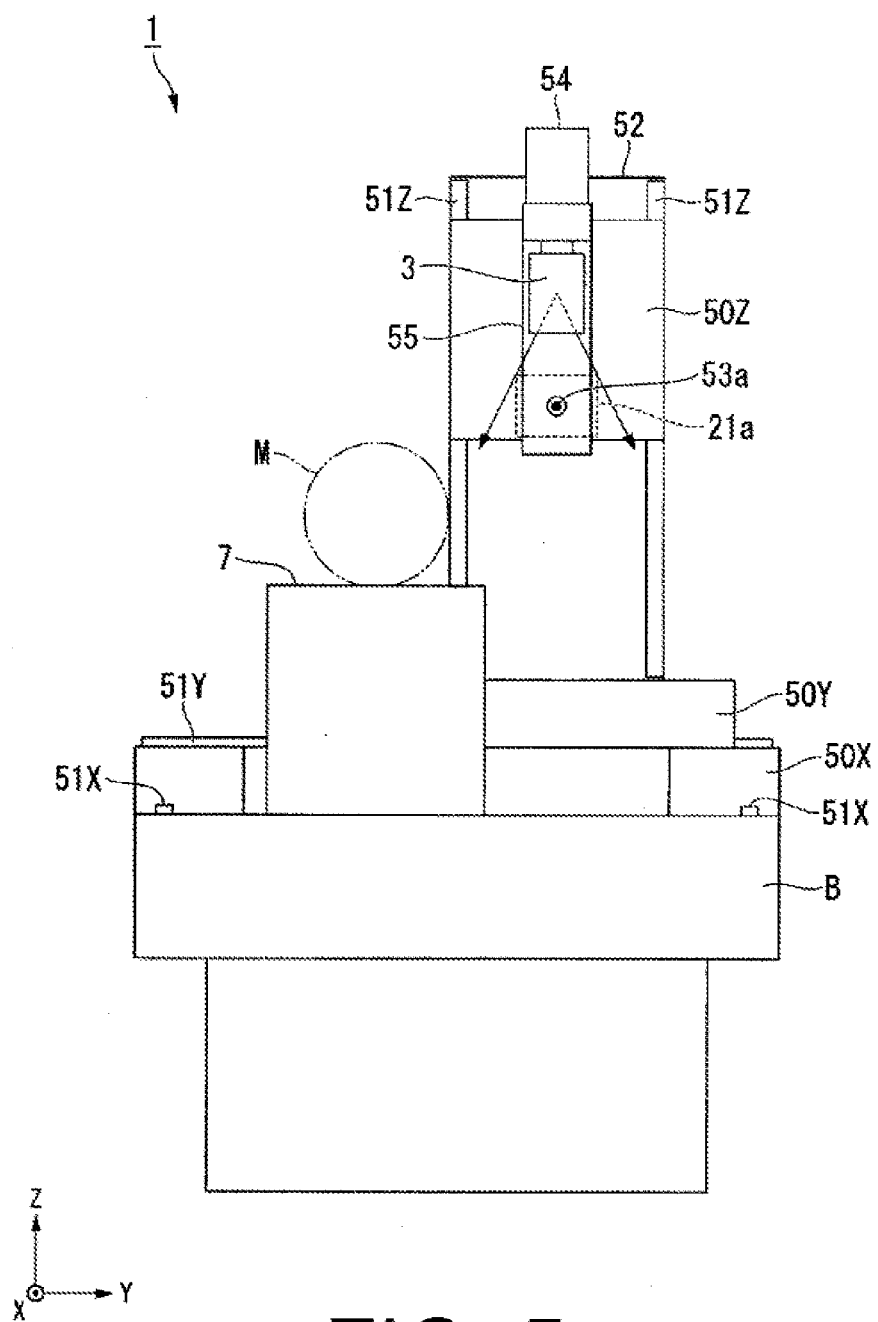
FIG. 5 is a front view of the shape measuring apparatus according to the first embodiment.

FIG. 1 is a diagram illustrating an external appearance of a shape measuring apparatus 1 according to a first embodiment, FIG. 2 is a schematic view of the overall configuration of the shape measuring apparatus 1 according to the present embodiment, FIG. 3 is a plan view of the shape measuring apparatus 1, FIG. 4 is a left-side view of the shape measuring apparatus 1, and FIG. 5 is a front view of the shape measuring apparatus 1. The shape measuring apparatus 1 measures a three-dimensional shape of an object (a subject) to be measured M using a light-section method, for example.

The shape measuring apparatus 1 includes a scanning device 2, an optical probe 3, and a control device 4. The shape measuring apparatus 1 is configured so that the optical probe 3 captures an image of the object M held on a holding section 7 that is provided on a base section B.

The scanning device 2 is configured to cause the object M and the optical probe 3 to move relative to each other so that the optical probe 3 scans the object M to make its image capturing range (field of view) cover the surface of the object M. The scanning device 2, as illustrated in FIG. 2, includes a driving unit 10 and a position detection unit 11. The driving unit 10 includes an X movement section 50X, a Y movement section 50Y, a Z movement section 50Z, and rotational driving units 53 and 54.

The X movement section 50X is provided so as to be freely movable in an X direction along guide portions 51X that are provided, extending in the X direction, at both side edges of the base section B in the Y direction. The Y movement section 50Y is provided so as to be freely movable in the Y direction along guide portions 51Y that are provided on the X movement section 50X, extending in the Y direction and with an interval therebetween in the X direction. A holding member 52 that extends in the Z direction is provided on the Y movement section 50Y. The Z movement section 50Z is provided so as to be freely movable in a Z direction along guide portions 51Z that are provided, extending in the Z direction, at both side edges of a holding member 52 in the Y direction. The X movement section 50X, the Y movement section 50Y, and the Z movement section 50Z constitute a movement mechanism capable of moving the rotational driving units 53 and 54 in the X direction, the Y direction, and the Z direction.

The rotational driving unit (a rotation mechanism) 53 changes an attitude of the optical probe 3 that is supported on a holding member (holding section) 55 to be described later, by rotating the optical probe 3 around a rotation axis line (rotation axis) 53a that is parallel to the X-axis, and has a rotational drive source such as a motor. A rotation angle of the rotational drive source (that is, a rotation angle of the optical probe 3 around the rotation axis line 53a) is read by an angle reading unit (not illustrated).

The rotational driving unit (a second rotation mechanism) 54 changes the attitude of the optical probe 3 that is supported on the holding member 55 by rotating the optical probe 3 around an axis line that is parallel to a direction in which a first holding section 55A to be described later extends, and has a second rotational drive source such as a motor. A rotation angle of the second rotational drive source (that is, a rotation angle of the optical probe 3 around the axis line that is parallel to the direction in which the first holding section 55A extends) is read by a second angle reading unit (not illustrated). The angle by which the rotational driving unit 53 rotates the optical probe 3 around the rotation axis line 53a is set to 300°, for example. In this manner, by enabling the optical probe 3 to rotate by more than 180°, the measurement of the object M is not limited to a front surface side thereof, and a rear surface side or a back surface side thereof can be measured as well.

Driving of the X movement section 50X, the Y movement section 50Y, the Z movement section 50Z, and the rotational driving units 53 and 54 is controlled by the control device 4 on the basis of a detection result from the position detection unit 11 that is constituted by an encoder device or the like.

The optical probe 3 includes a light source device 8 and an image capturing device 9, and is supported on the holding member 55. The holding member 55 is formed in an approximate L shape, formed by the first holding section (first section, first member) 55A that extends in a direction orthogonal to the rotation axis line 53a and is supported on the rotational driving unit 53 being orthogonal to a second holding section (second section, second member) 55B that is provided on an end portion on a far side of the first holding 55A relative to the object M and extends parallel to the rotation axis line 53a, and the optical probe 3 is supported on an end portion of the second holding section 55B on the positive side in the X-axis direction. A position of the rotation axis line 53a of the rotational driving unit 53 is set to be closer to the object M than the optical probe 3 (this will be described in detail later).

The light source device 8 is a device that irradiates part of the object M held on the holding section 7 with light under control of the control device 4 and that includes a light source 12 and an illumination optical system 13. The light source 12 according to the present embodiment includes a laser diode, for example. Note that aside from a laser diode, the light source 12 may include a solid-state light source such as a light-emitting diode (LED).

Meanwhile, although the holding section 7 is fixed in the present embodiment, the configuration may be such that the holding section 7 is driven. The holding section 7 may be driven with a position detection unit that is constituted by an encoder device or the like provided therein. In this case, the holding section 7 may be movable in the X-axis, Y-axis, and Z-axis directions. The configuration may further be such that the holding section 7 rotates around the X-axis, Y-axis, and Z-axis directions. These configurations may also be combined as desired.

The illumination optical system 13 adjusts a spatial light intensity distribution of the light emitted from the light source 12. The illumination optical system 13 of the present embodiment includes a cylindrical lens, for example. The illumination optical system 13 may be a single optical element, or may include a plurality of optical elements. The light emitted from the light source 12 has its spot widened in a direction in which the cylindrical lens has positive power, and is emitted in a first direction that is from the light source device 8 toward the object M. As illustrated in FIG. 2, an illumination beam L emitted from the light source device 8 and projected onto the object M forms a projection pattern that passes through the rotation axis line 53a, with a direction in which a shape of the spot in a plane orthogonal to a direction of the emission from the light source device 8 is parallel to the rotation axis line 53a taken as a longitudinal direction. Accordingly, the object M is irradiated with the light emitted from the light source 12 through the illumination optical system 13. Note that the illumination optical system 13 may include a diffractive optical element such as a CGH, and may adjust the spatial light intensity distribution of the illumination beam L emitted from the light source 12 using the diffractive optical element. Meanwhile, in the present embodiment, projected light in which spatial light intensity distribution has been adjusted is sometimes referred to as pattern light. The illumination beam L is an example of the pattern light.

The image capturing device 9 includes an imaging element 20 and an image-forming optical system 21. The illumination beam L from the light source device 8, with which the object M has been irradiated, is reflected and scattered by a surface of the object M, and at least some of the reflected and scattered light is incident on the image-forming optical system 21. In the image capturing device 9, the imaging element 20 detects the illumination beam L that is incident on the image-forming optical system 21 via the surface of the object M from the light source device 8.

The image-forming optical system 21 forms, on a light receiving plane 20a (image plane or image surface) of the imaging element 20, a plane conjugate to an object plane 21a corresponding to a plane containing the emission direction of the illumination beam L that takes the form of line light from the light source device 8 and the longitudinal direction of the spot shape of the illumination beam L. Note that the plane containing the emission direction of the illumination beam L from the light source device 8 and the longitudinal direction of the spot shape of the illumination beam L is substantially parallel to a direction in which the illumination beam L propagates. In this manner, the image-forming optical system 21 forms, on the light receiving plane 20a of the imaging element 20, an image of a pattern drawn on the object M by the illumination beam L emitted from the light source device 8 to the object M.

Meanwhile, the aforementioned rotation axis line 53a of the rotational driving unit 53 is located closer to the object M than the optical probe 3, as illustrated in FIG. 2. To be more specific, the rotation axis line 53a is located at a position, on the object plane 21a, passing through a center area of the object plane 21a in the irradiation direction (optical axis direction, a predetermined direction) of the illumination beam L.

The illumination beam L emitted from the light source device 8 and then reflected and scattered from a single point on the object M is collected into essentially a single point on the light receiving plane of the imaging element 20 by passing through the image-forming optical system 21. In other words, points in the image formed on the imaging element 20 correspond to respective points on a line where the object plane in the image-forming optical system 21 intersects with the object M. In this manner, information indicating an image capturing result of the image capturing device 9 includes information indicating a position of each point on the surface of the object M.

Meanwhile, because the illumination beam L is line light that passes through the rotation axis line 53a, information indicating a position of each point on a line where the object plane 21a that passes through the rotation axis line 53a intersects with the object M can be acquired even in the case where the optical probe 3 has rotated around the rotation axis line 53a.

The control device 4 controls each of the units of the shape measuring apparatus 1, and includes a shape information acquisition unit (calculating unit or computing unit) 14 that acquires shape information of the object M by carrying out calculation processing on the basis of the image capturing result from the optical probe 3. In the present embodiment, the shape information includes information indicating at least one of a shape, a dimension, an unevenness distribution, a surface roughness, and a position (coordinates) of a point on a surface to be measured, for at least part of the object M to be measured. A display device 5 and an input device 6 are connected to the control device 4.

Although the control device 4 includes the shape information acquisition unit 14 and the display device 5 and input device 6 are connected to the control device 4 in the present embodiment, these may be, for example, constituted by a computer connected to the shape measuring apparatus 1, or a host computer located in a structure where the shape measuring apparatus 1 is installed, or, rather than being limited to a structure where the shape measuring apparatus 1 is installed, may be at a position distanced from the shape measuring apparatus 1 and connected by a computer to the shape measuring apparatus 1 using a communication system such as the Internet. Furthermore, the shape information acquisition unit 14 that acquires the shape information, and the input device 6 and display device 5 may be held at different locations. For example, the shape measuring apparatus 1 may be supported within the optical probe 3, for example, outside of a computer that includes the input device 6 and the display device 5. In this case, the information acquired by the shape measuring apparatus 1 is connected to the computer using a communication system.

Here, the shape information acquisition unit 14 acquires the shape information of the object M by carrying out calculation processing on the basis of the image capturing result from the optical probe 3. Although the calculation processing may be carried out using all of the information in the image capturing result from the optical probe 3, the calculation processing may be carried out using at least some of that information.

The control device 4 controls relative positions of the optical probe 3 and the object M by controlling the driving unit 10 of the scanning device 2. In addition, the control device 4 causes the optical probe 3 to capture an image of a measurement region on the object M by controlling the optical probe 3. The control device 4 acquires position information of the optical probe 3 from the position detection unit 11 of the scanning device 2, and acquires data expressing the captured image of the measurement region (captured image data) from the optical probe 3. Then, by associating a position on the surface of the object M acquired from the captured image data that is based on the position of the optical probe 3 with the position of the optical probe 3, the control device 4 calculates and acquires the shape information on a three-dimensional shape of a measurement target.

The input device 6 is constituted by various types of input devices such as a keyboard, a mouse, a joystick, a trackball, and a touchpad. The input device 6 accepts the input of various types of information for the control device 4. The various types of information include instruction information indicating an instruction (command) to cause the shape measuring apparatus 1 to begin measurement, configuration information regarding the measurement carried out by the shape measuring apparatus 1, operation information for manually operating at least part of the shape measuring apparatus 1, and the like, for example.

The display device 5 is constituted by a liquid-crystal display device, an organic electroluminescence display device, or the like, for example. The display device 5 displays measurement information regarding the measurement to be carried out by the shape measuring apparatus 1. The measurement information includes configuration information indicating configurations regarding the measurement, progress information indicating progress of the measurement, the shape information indicating a result of the measurement, and the like, for example. The display device 5 of the present embodiment is supplied with image data expressing the measurement information from the control device 4 and displays an image expressing the measurement information on the basis of this image data.

Next, an example of operations for measuring the shape of the object M carried out by the shape measuring apparatus 1 having the aforementioned configuration will be described with reference to FIGS. 6A to 6D. For the present embodiment, a case where the rotation axis line 53a is orthogonal to a plane (a plane parallel to the paper surface in FIG. 2) that contains the first direction in which the illumination beam L emitted from the light source 12 illustrated in FIG. 2 travels and a second direction in which the illumination beam L reflected by the object M is incident on the image-forming optical system 21 will be described. Here, a case will be described in which the object M includes a first surface Ma that is parallel to an XY plane and a second surface Mb that is tilted relative to the first surface Ma and the shape measuring apparatus 1 measures the first surface Ma and the second surface Mb in sequence, as illustrated in FIGS. 6A to 6D.

First, as illustrated in FIG. 6A, the illumination beam L is emitted with the object plane 21a and the first surface Ma intersecting with each other, and the imaging element 20 receives the light scattered and reflected by the first surface Ma through the image-forming optical system 21 and forms an image. While the first surface Ma is being measured, the holding member 55 does not rotate, and the optical probe 3 carries out the measurement directly above the rotation axis line 53a (a twelve o'clock position around the rotation axis line 53a), as illustrated in FIGS. 1, 6A, and the like. Note that the holding member 55 may rotate while the measurement is being carried out. The optical probe 3 and the rotation axis line 53a are located at a distance from each other.

The control device 4 stores the position of the optical probe 3 detected by the position detection unit 11 in association with the shape information of the first surface Ma acquired by the shape information acquisition unit 14. The control device 4 acquires the shape information of the first surface Ma while changing the Y direction position of the optical probe 3 by moving the Y movement section 50Y through the driving unit 10, as illustrated in FIG. 6B.

Upon the object plane 21a reaching the second surface Mb, the control device 4 controls the rotational driving unit 53 so that the optical probe 3 rotates, through the holding member 55, in the clockwise direction around the rotation axis line 53a at an angle of the tilt of the second surface Mb relative to the first surface Ma, as illustrated in FIG. 6C. The rotation of the optical probe 3 is carried out through the rotation of the holding member 55 as a result of an operation performed by the rotational driving unit 53 (rotational drive source), and the control device 4 controls the position of the optical probe 3 in the rotation direction by controlling the operation of the rotational drive source on the basis of the rotation angle read by the angle reading unit.

Accordingly, the illumination beam L is incident on the second surface Mb at the same angle of incidence as when measuring the shape information of the first surface Ma, and the shape information of the second surface Mb is acquired. Then, the control device 4 acquires the shape information of the second surface Mb while changing the Y direction position of the optical probe 3 by moving the Y movement section 50Y through the driving unit 10, as illustrated in FIG. 6D.

As such, the shape information of the first surface Ma and the second surface Mb can be acquired continuously.

Next, a case where the second surface Mb is a curved surface or an arc surface rather than a slanted surface will be described with reference to FIGS. 7A to 7D. In this case, it is assumed that a position of the center of the curve of the second surface Mb in the Z direction matches the position of the rotation axis line 53a in the Z direction.

Figure 7A:
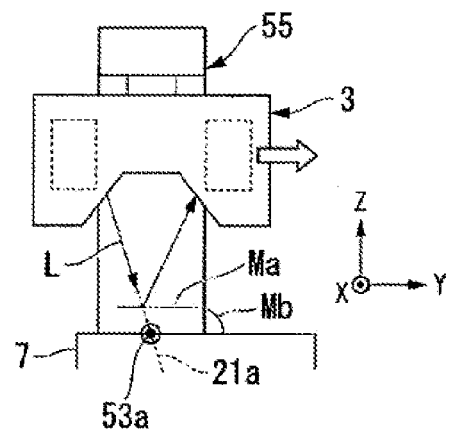
FIGS. 7A to 7D are diagrams illustrating an example of measurement operations of the shape measuring apparatus according to the first embodiment.
Figure 7B:
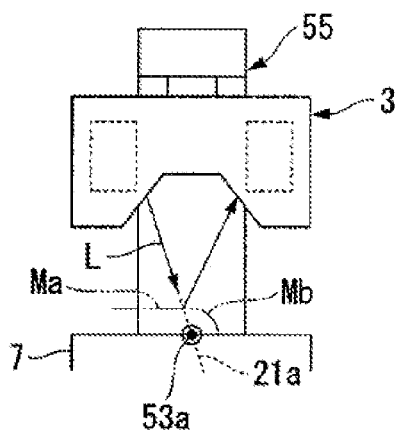
Figure 7C:
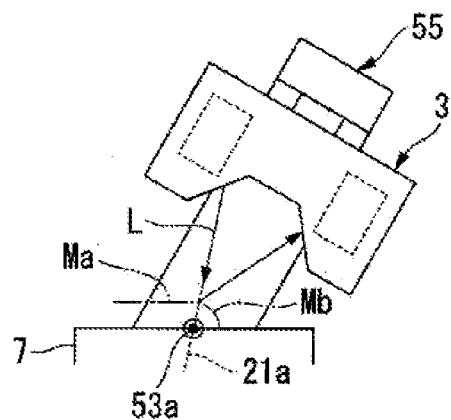
Figure 7D:
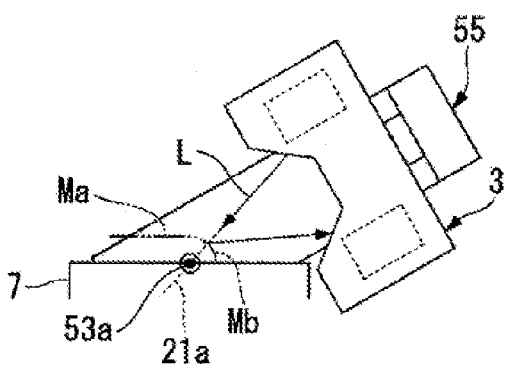

As illustrated in FIGS. 7A to 7B, the shape information of the first surface Ma is acquired by the optical probe 3 while changing the Y direction position thereof, and upon the object plane 21a reaching the second surface Mb, the control device 4 rotates the optical probe 3 around the rotation axis line 53a through the holding member 55 by controlling the rotational driving unit 53, as illustrated in FIGS. 7C and 7D. At this time, the control device 4 rotates the optical probe 3 about the rotation axis line 53a until the measurement of the shape information of the second surface Mb is complete.

Accordingly, the measurement of the shape information can be carried out in a state where an angle at which the object plane 21a intersects with the second surface Mb is constant, even in the case where the second surface Mb is a curved surface. Meanwhile, keeping an optical path length of the illumination beam L constant during measurement makes it possible to suppress a drop in measurement accuracy caused by variations in measurement conditions.

According to the present embodiment described thus far, while the optical probe 3 is being rotated, the rotation axis line 53a is located closer to the object plane 21a than the optical probe 3, and to be more specific, the rotation axis line 53a is located on the object plane 21a and a distance between the rotation axis line 53a and the object plane 21a is set to be shorter than a distance between the object plane 21a and the optical probe 3. As such, by making a rotation radius smaller than in the case where the rotation axis line 53a is located on the side opposite from the object plane 21a with the optical probe 3 therebetween, error arising in the position information of the optical probe 3 can be reduced even in the case where error has arisen in the rotation angle, which in turn makes it possible to suppress a drop in the accuracy of a result of measuring the shape information. Furthermore, according to the present embodiment, the rotation radius of the optical probe 3 can be reduced, and thus the apparatus can be miniaturized; moreover, the amount of time required to move the optical probe 3 to a measurement position can be shortened, which also makes it possible to improve the productivity of the apparatus.

Second Embodiment

Next, a second embodiment of the shape measuring apparatus 1 will be described with reference to FIGS. 8 and 9.

In the drawings, elements identical to the constituent elements of the first embodiment illustrated in FIGS. 1 to 7 will be given the same reference numerals, and descriptions thereof will be omitted.

Although the first embodiment describes a case where the rotation radius is constant when the holding member 55 and the optical probe 3 are rotated around the rotation axis line 53a, the present embodiment will describe a case where the rotation radius is variable.

Figure 8:
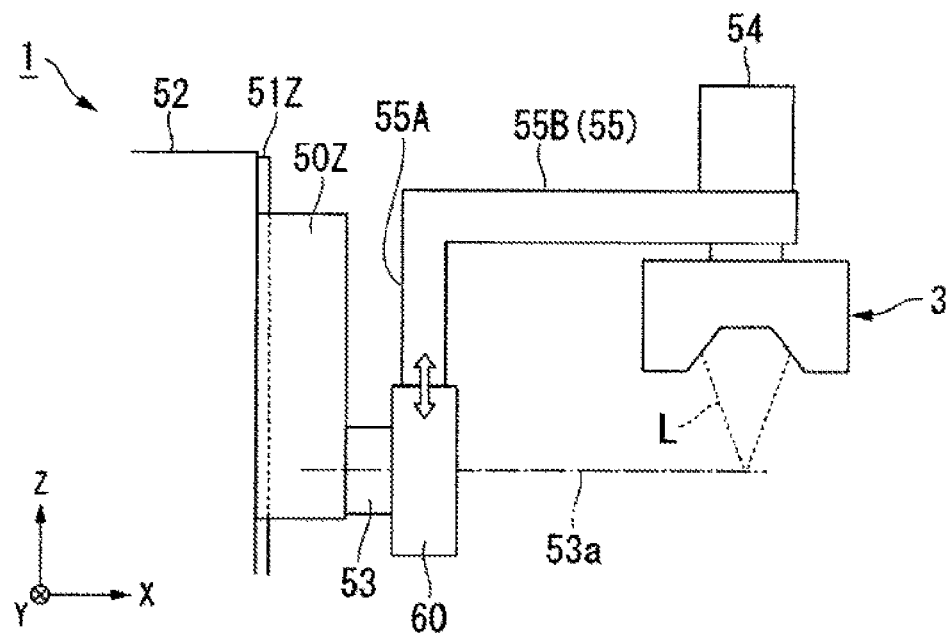
FIG. 8 is a diagram illustrating part of a shape measuring apparatus according to a second embodiment.
Figure 9:
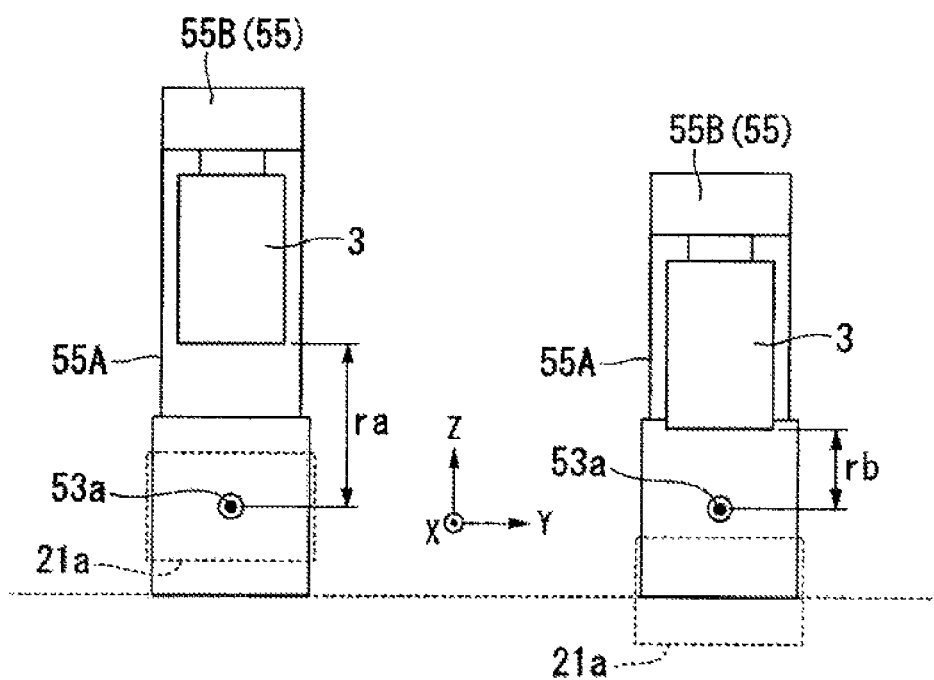
FIG. 9 is a diagram illustrating movements of a holding member according to the second embodiment.

As illustrated in FIG. 8, a linear motion mechanism (distance varying mechanism) 60 is connected to the rotational driving unit 53 in the shape measuring apparatus 1 according to the present embodiment. The linear motion mechanism 60 linearly moves the first holding section 55A of the holding member 55 in a length direction (a direction orthogonal to the rotation axis line 53a) under the control of the control device 4, so that the second holding section 55B and the optical probe 3 along with the object plane 21a are moved in directions toward and away from the rotation axis line 53a. As a result, a distance from the rotation axis line 53a to the optical probe 3, or in other words, the rotation radius of the optical probe 3 around the rotation axis line 53a, can be set to a desired value from a radius ra to a radius rb, as illustrated in FIG. 9.

In the case where the second surface Mb of the object M is a curved surface, for example, according to the shape measuring apparatus 1 having the aforementioned configuration, by controlling the linear motion mechanism 60 so as to adjust the rotation radius of the optical probe 3 to match a radius of the curved surface, highly-accurate shape information measurement as described for the first embodiment with reference to FIG. 7 is possible without being restricted by the magnitude of the radius of the curved surface. Accordingly, even for an object M having a surface formed by a plurality of curved surfaces of different radii, adjusting not only the position of the optical probe 3 in the X direction, the Y direction, and the Z direction but also the rotation angle and the rotation radius so as to conform to the surface shape of the object M during measurement makes it possible to carry out the shape information measurement at the optimal attitude and position for that surface shape, and thus even more accurate shape information measurement can be realized.

Third Embodiment

Next, a third embodiment of the shape measuring apparatus 1 will be described with reference to FIG. 10.

In this drawing, elements identical to the constituent elements of the first embodiment illustrated in FIGS. 1 to 7 will be given the same reference numerals, and descriptions thereof will be omitted.

Figure 10:
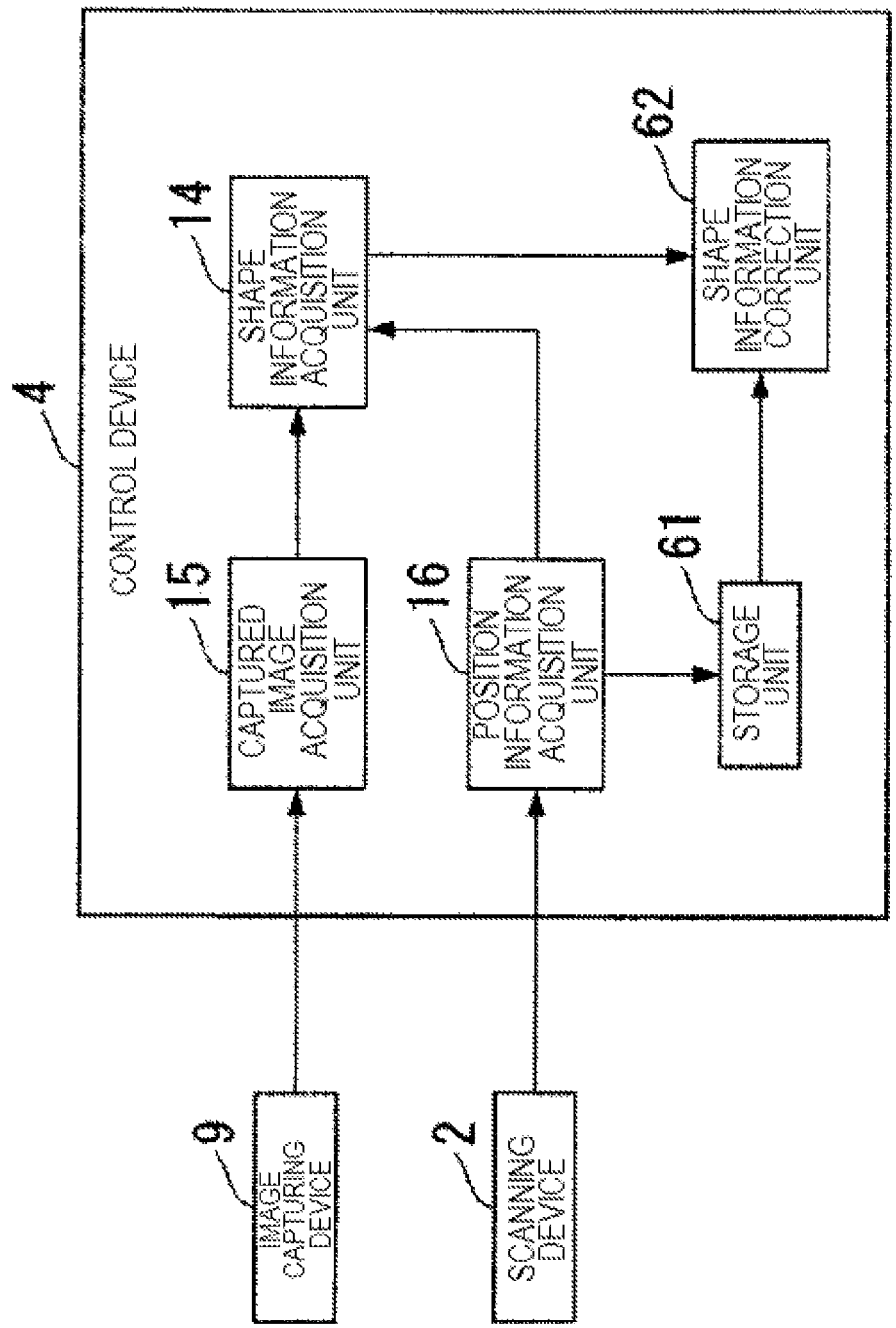
FIG. 10 is a block diagram illustrating the overall configuration of a shape measuring apparatus according to a third embodiment.

FIG. 10 is a control block diagram illustrating the shape measuring apparatus 1 according to the third embodiment.

As illustrated in FIG. 10, the control device 4 of the present embodiment includes a storage unit 61 and a shape information correction unit (correction unit) 62. The storage unit 61 stores deformation information indicating deformation that is based on the attitude of the holding member 55, arising due to the rotation around the rotation axis line 53a performed by the rotational driving unit 53, and the like. This deformation information is found in advance through experimentation, simulation, or the like, and is stored in the storage unit 61.

The shape information correction unit 62 corrects, on the basis of the deformation information of the holding member 55 stored in the storage unit 61, position information of the optical probe 3 detected by the scanning device 2 (the position detection unit 11) and acquired by a position information acquisition unit 16, and associates the corrected position information of the optical probe 3 with the shape information acquired by the shape information acquisition unit 14.

Therefore, in the shape measuring apparatus 1 of the present embodiment, in addition to the same actions and effects as the first embodiment described above, even in the case where it is likely that error arises in the position information of the optical probe 3 due to deformation such as distortion, bending, and the like arising in the holding member 55 from the rotation performed by the rotational driving unit 53, the position information of the optical probe 3 can be corrected on the basis of that deformation and thus highly-accurate shape information measurement can continuously carried out.

Fourth Embodiment

Figure 11:
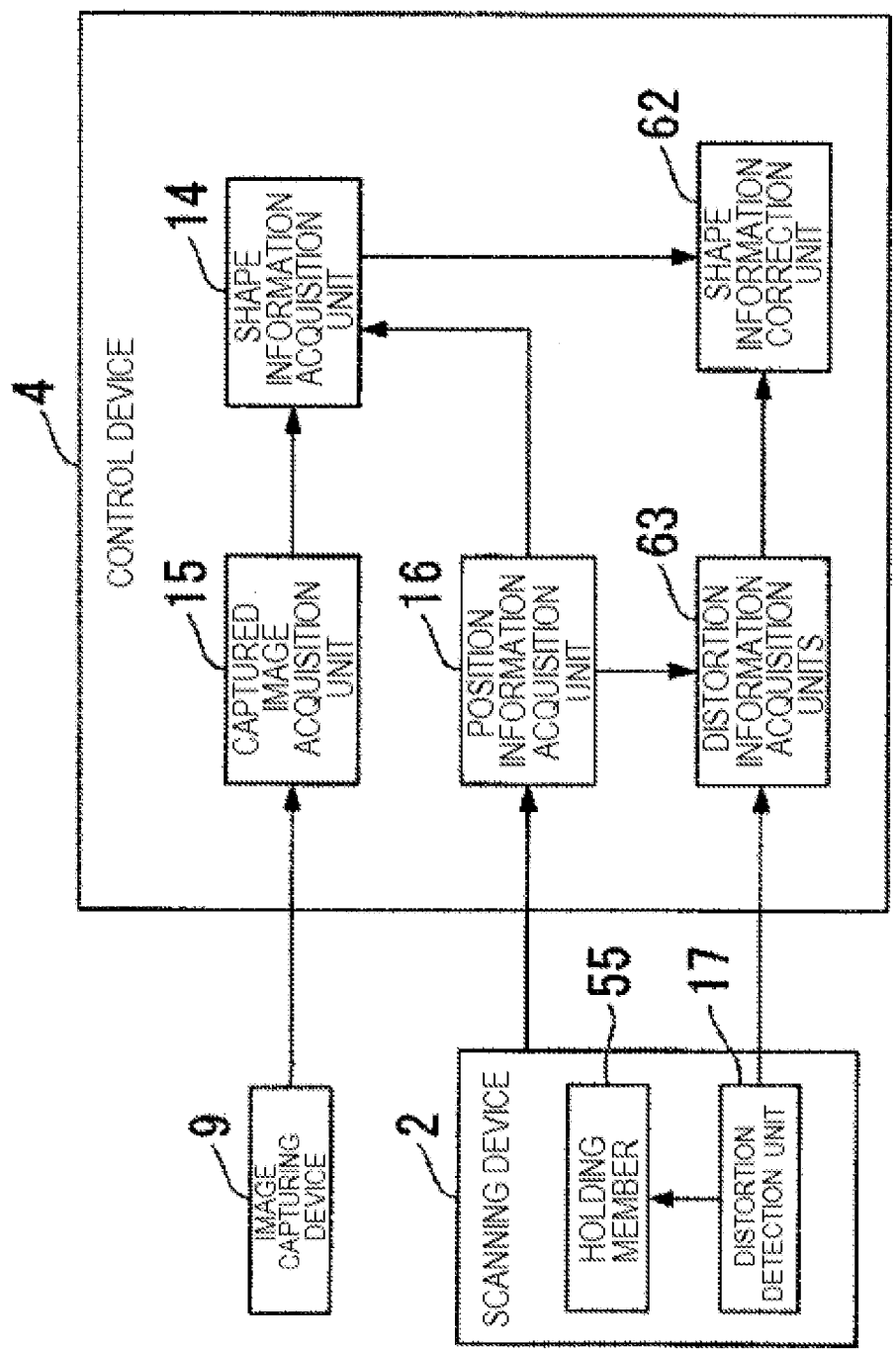
FIG. 11 is a block diagram illustrating the overall configuration of a shape measuring apparatus according to a fourth embodiment.

Next, a fourth embodiment of the shape measuring apparatus 1 will be described with reference to FIG. 11.

In this drawing, elements identical to the constituent elements of the third embodiment illustrated in FIG. 10 will be given the same reference numerals, and descriptions thereof will be omitted.

Although the third embodiment has a configuration in which deformation information of the holding member 55 is found and stored in advance and the position information of the optical probe 3 is corrected using the deformation information, in the present embodiment, the holding member 55 is provided with a distortion detection unit 17 such as a distortion gauge as a deformation detection unit in order to detect the distortion information of the holding member 55.

In addition, the control device 4 according to the present embodiment includes a distortion information acquisition unit 63 that acquires a detection result from the distortion detection unit 17.

According to the shape measuring apparatus 1 of the present embodiment, when measuring the shape information, the shape information correction unit 62 corrects the position information of the optical probe 3 acquired by the position information acquisition unit 16 using the deformation information of the holding member 55 detected by the distortion detection unit 17, and associates the corrected position information of the optical probe 3 with the shape information acquired by the shape information acquisition unit 14.

Therefore, in addition to the same actions and effects as the aforementioned third embodiment, the shape measuring apparatus 1 of the present embodiment makes it possible to carry out highly-accurate shape information measurement in accordance with the environment even in a state where the deformation information of the holding member 55 found in advance has a different value due to environmental changes in temperature, humidity, and the like.

Fifth Embodiment

Next, a fifth embodiment of the shape measuring apparatus 1 will be described with reference to FIG. 12.

In this drawing, elements identical to the constituent elements of the fourth embodiment illustrated in FIG. 11 will be given the same reference numerals, and descriptions thereof will be omitted.

Figure 12:
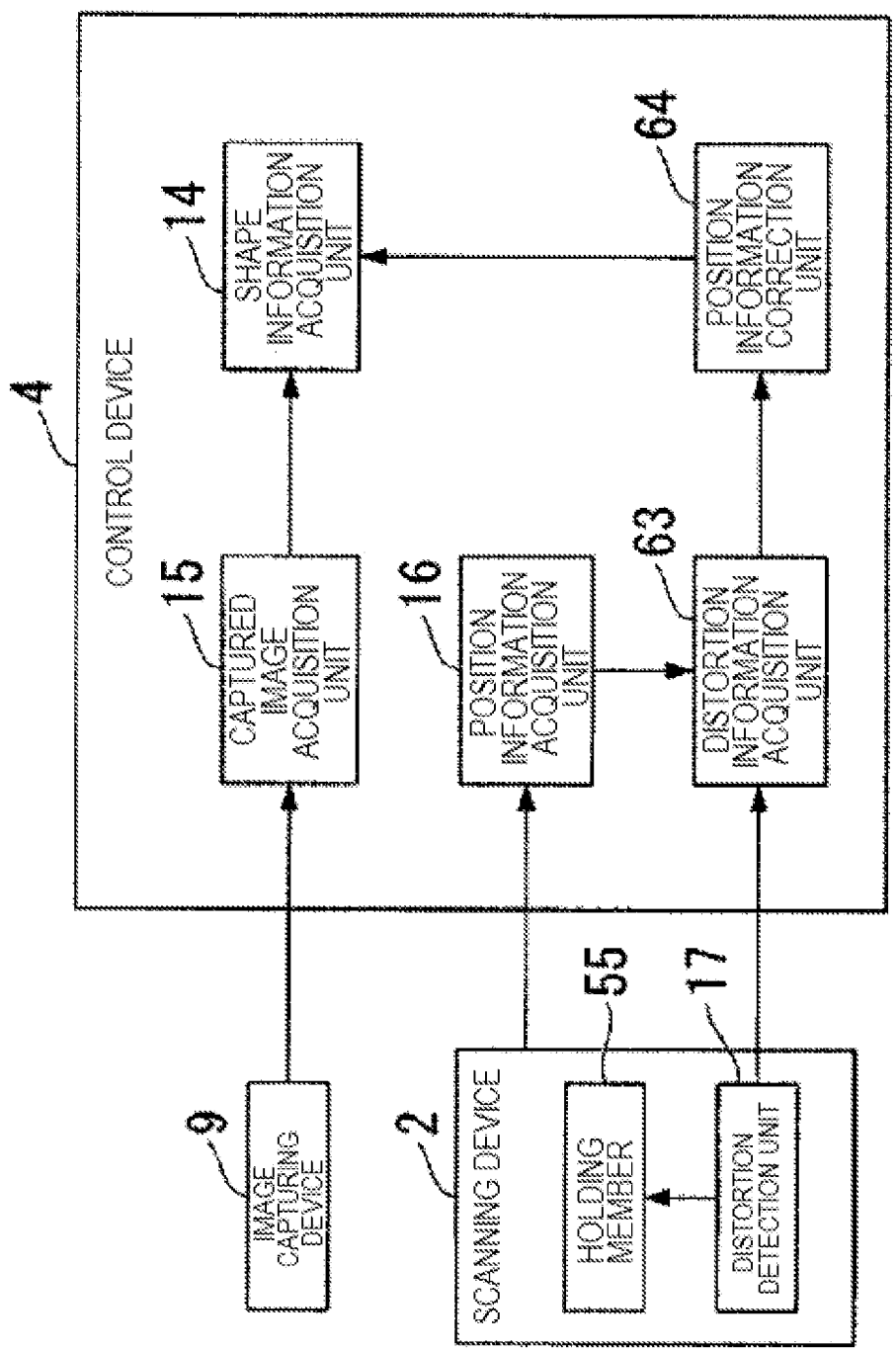
FIG. 12 is a block diagram illustrating the overall configuration of a shape measuring apparatus according to a fifth embodiment.

The aforementioned fourth embodiment has a configuration in which the shape information correction unit 62 corrects the position information of the optical probe 3 using the detected deformation information of the holding member 55 and associates the corrected position information of the optical probe 3 with the shape information acquired by the shape information acquisition unit 14; however, in the present embodiment, a position information correction unit 64 corrects the position information of the optical probe 3 using the deformation information of the holding member 55 acquired by the distortion information acquisition unit 63 and the position information of the optical probe 3 acquired by the position information acquisition unit 16, and the shape information acquisition unit 14 associates an image acquired by a captured image acquisition unit 15 with the corrected position information of the optical probe 3, as illustrated in FIG. 12.

Accordingly, the present embodiment can achieve the same actions and effects as the aforementioned fourth embodiment.

Sixth Embodiment

Next, a sixth embodiment of the shape measuring apparatus 1 will be described with reference to FIG. 13.

In this drawing, elements identical to the constituent elements of the first embodiment illustrated in FIGS. 1 to 7 will be given the same reference numerals, and descriptions thereof will be omitted.

In the present embodiment, a description will be given of a configuration in which the image capturing performed by the image capturing device 9 is controlled in accordance with, for example, vibrations arising during the rotational operation of the holding member 55.

Figure 13:
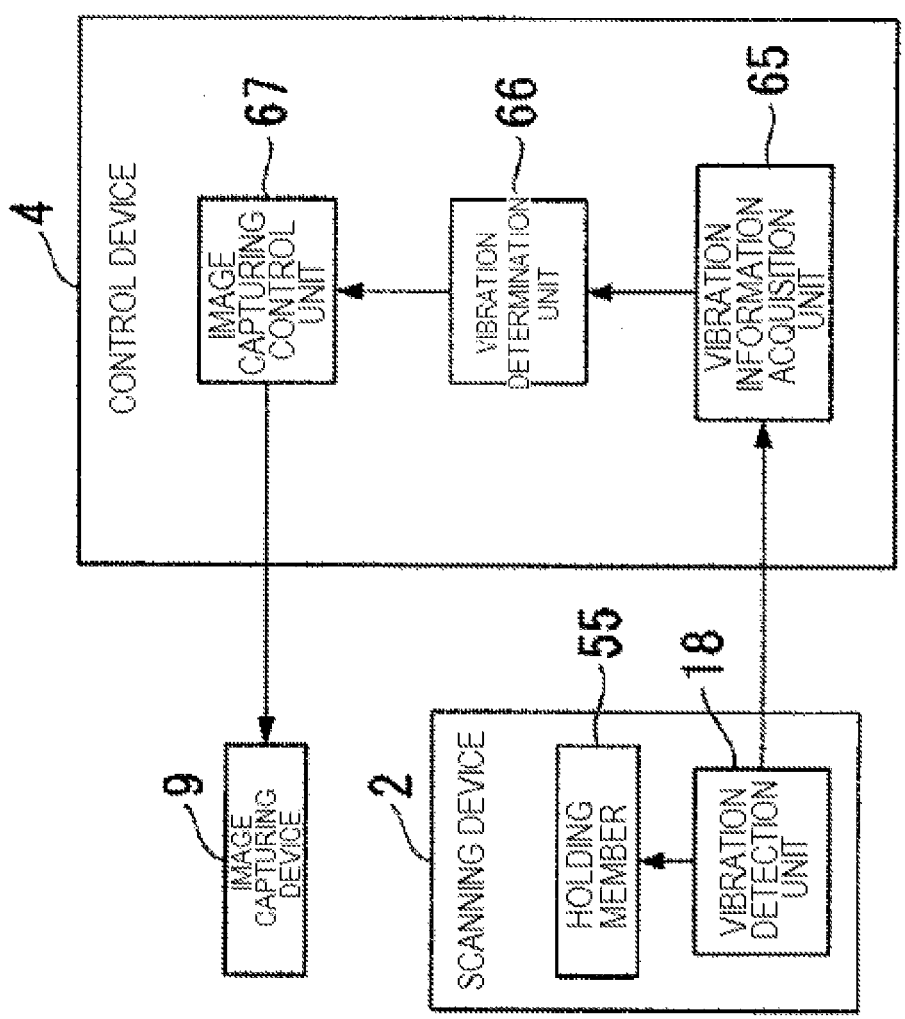
FIG. 13 is a block diagram illustrating the overall configuration of a shape measuring apparatus according to a sixth embodiment.

Specifically, as illustrated in FIG. 13, the shape measuring apparatus 1 of the present embodiment includes a vibration detection unit 18 that detects vibration information of the holding member 55. Meanwhile, the control device 4 includes a vibration information acquisition unit 65 that acquires the vibration information detected by the vibration detection unit 18, a vibration determination unit 66 that determines the acquired vibration information, and an image capturing control unit 67 that controls the image capturing device 9 on the basis of a determination result from the vibration determination unit 66.

In the shape measuring apparatus 1 having the aforementioned configuration, information of vibrations arising during the rotational operation and the like of the holding member 55 is outputted to the vibration determination unit 66 via the vibration detection unit 18 and the vibration information acquisition unit 65. The vibration determination unit 66 determines whether the vibrations in the holding member 55 have exceeded a predetermined threshold; in the case where the threshold is not exceeded, the image capturing device 9 is caused to execute an image capturing process, whereas in the case where the threshold is exceeded, the image capturing process of the image capturing device 9 is caused to stand by until the vibrations have been dampened to within a predetermined range and have reached a threshold, and whereupon the image capturing device 9 is caused to execute the image capturing process.

Accordingly, in addition to the same actions and effects as the first embodiment, the present embodiment makes it possible to carry out highly-accurate shape information measurement in a state where the adverse effects of vibration arising from rotational operation and the like have been eliminated.

In addition to a procedure that controls the execution of the image capturing process in accordance with the information of vibrations as described above, a procedure may be carried out in which, for example, error information for the shape information of the object M generated upon the occurrence of vibration is measured in advance in association with information of the vibration and stored as a table, the table is referred to on the basis of the vibration information acquired by the vibration detection unit 18 and the vibration information acquisition unit 65, and the measured shape information of the object M is corrected on the basis of the error information corresponding to the vibration information.

Even with this procedure, it is possible to carry out highly-accurate shape information measurement in a state in which the adverse effects of vibration caused by rotational operation and the like have been eliminated.

Next, a structure manufacturing system including the aforementioned shape measuring apparatus will be described with reference to FIG. 14.

Figure 14:
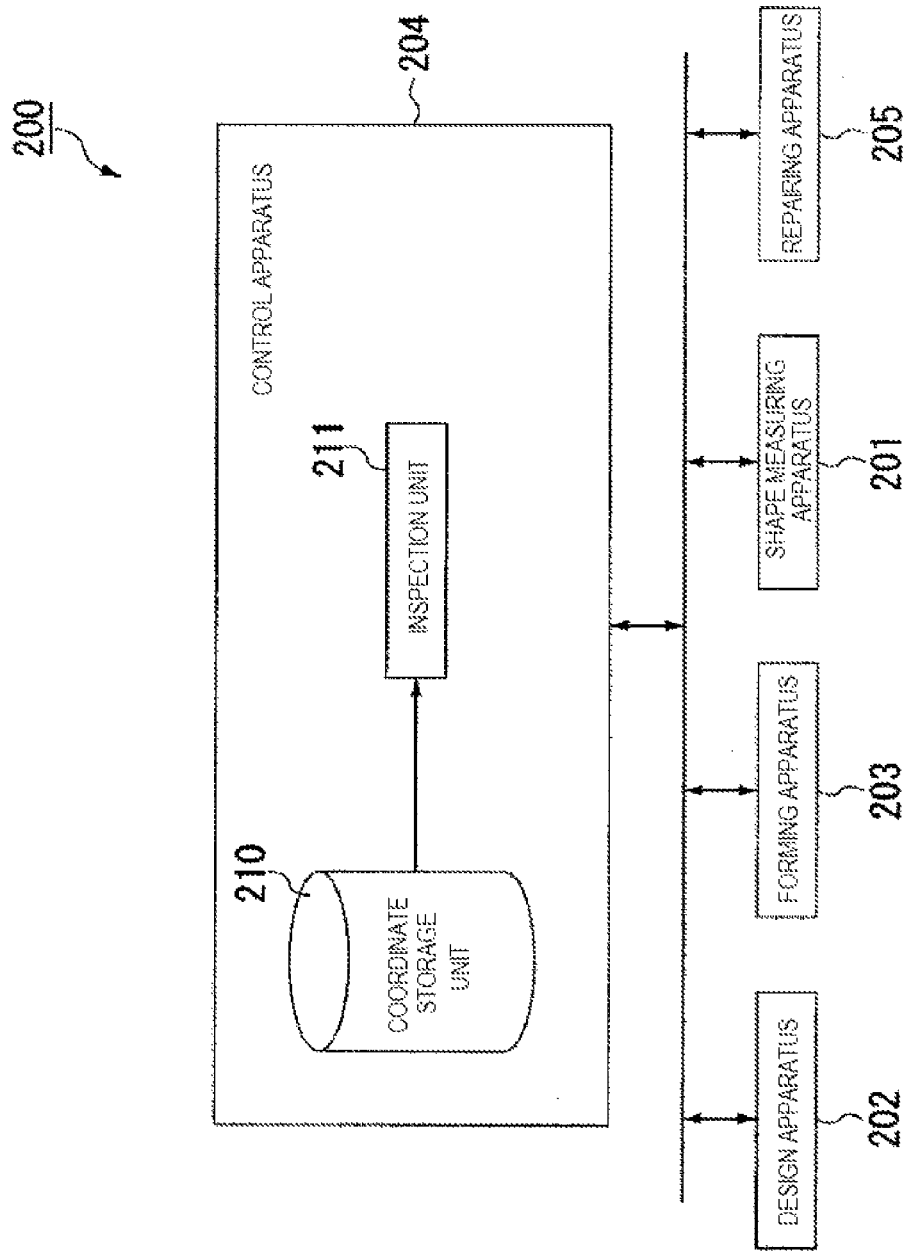
FIG. 14 is a diagram illustrating the configuration of a structure manufacturing system according to the embodiments.

FIG. 14 is a block diagram illustrating a structure manufacturing system 200. The structure manufacturing system 200 according to the present embodiment includes a shape measuring apparatus 201 such as that described in the aforementioned embodiments, a design apparatus 202, a forming apparatus 203, a control apparatus (inspection apparatus) 204, and a repairing apparatus 205. The control apparatus 204 includes a coordinate storage unit 210 and an inspection unit 211.

The design apparatus 202 generates design information regarding a shape of a structure, and sends the generated design information to the forming apparatus 203. The design apparatus 202 stores the generated design information in the coordinate storage unit 210 of the control apparatus 204. The design information includes information indicating coordinates of each of positions on the structure.

The forming apparatus 203 forms the stated structure on the basis of the design information inputted from the design apparatus 202. The forming process performed by the forming apparatus 203 includes a casting process, a forging process, a machining process, and the like, for example. The shape measuring apparatus 201 measures the coordinates of the structure (measurement target) that has been formed, and sends information indicating the measured coordinates (the shape information) to the control apparatus 204.

The coordinate storage unit 210 of the control apparatus 204 stores the design information. The inspection unit 211 of the control apparatus 204 retrieves the design information from the coordinate storage unit 210. The inspection unit 211 compares the information indicating the coordinates received from the shape measuring apparatus 201 (the shape information) with the design information retrieved from the coordinate storage unit 210. The inspection unit 211 then determines, on the basis of a comparison result, whether or not the structure has been formed according to the design information. In other words, the inspection unit 211 determines whether the formed structure is a non-defective product. In the case where the structure has not been formed according to the design information, the inspection unit 211 determines whether or not the structure can be repaired. In the case where the structure can be repaired, the inspection unit 211 calculates a defective area and the amount of repair on the basis of the comparison result, and sends information indicating the defective area and information indicating the amount of repair to the repairing apparatus 205.

The repairing apparatus 205 processes the defective area of the structure on the basis of the information indicating the defective area and the information indicating the amount of repair received from the control apparatus 204.

Figure 15:
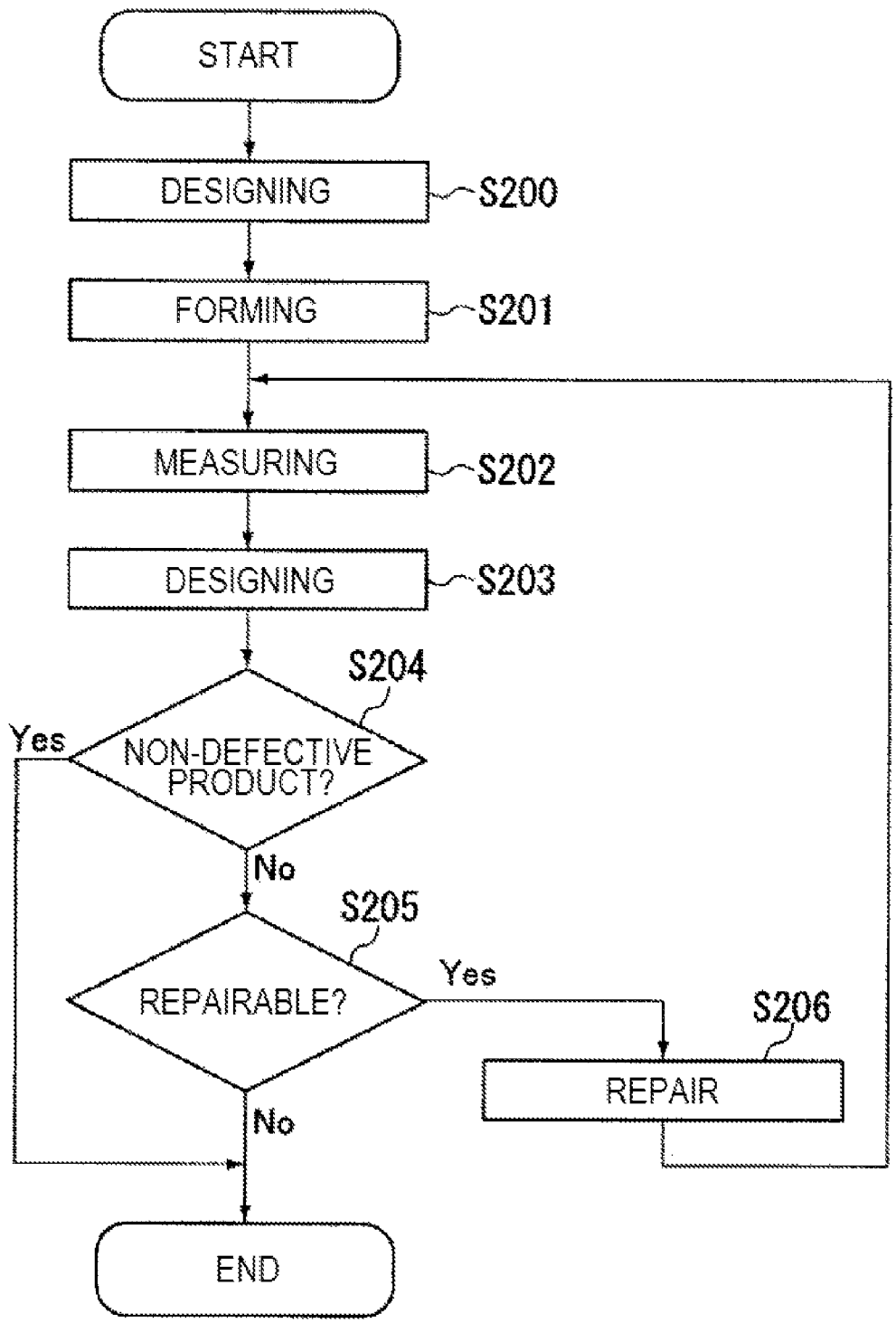
FIG. 15 is a flowchart illustrating a structure manufacturing method according to the embodiments.

FIG. 15 is a flowchart illustrating a flow of processing carried out by the structure manufacturing system 200. In the structure manufacturing system 200, first, the design apparatus 202 generates the design information regarding the shape of the structure (step S200). Next, the forming apparatus 202 forms the stated structure on the basis of the design information (step S201). Next, the shape measuring apparatus 201 measures the shape of the structure that has been formed (step S202). Next, the inspection unit 211 of the control apparatus 204 inspects whether or not the structure has been formed according to the design information by comparing the shape information acquired by the shape measuring apparatus 201 with the stated design information (step S203).

Next, the inspection unit 211 of the control apparatus 204 determines whether or not the structure that has been formed is a non-defective product (step S105). In the case where the inspection unit 211 has determined that the structure that has been formed is a non-defective product (YES in step S204), the structure manufacturing system 200 terminates the processing. However, in the case where the inspection unit 211 determines that the structure that has been formed is not a non-defective product (NO in step S204), the inspection unit 211 determines whether or not the structure that has been formed can be repaired (step S205).

In the case where the inspection unit 211 determines that the structure that has been formed can be repaired (YES in step S205), the repairing apparatus 205 reworks the structure (step S206), and the structure manufacturing system 200 returns to step S103. However, in the case where the inspection unit 211 has determined that the structure that has been formed cannot be repaired (No in step S205), the structure manufacturing system 200 terminates the processing. The structure manufacturing system 200 completes the processing illustrated in the flowchart of FIG. 15 in this manner.

According to the structure manufacturing system 200 of the present embodiment, the shape measuring apparatus according to the aforementioned embodiments can measure coordinates of the structure with high accuracy, and thus it can be determined whether or not the structure that has been formed is a non-defective product. Moreover, the structure manufacturing system 200 can implement reworking of and repair the structure in the case where the structure is not a non-defective product.

Note that the repair process executed by the repairing apparatus 205 in the present embodiment may be replaced with a process in which the forming apparatus 203 re-executes a forming process. Here, the forming apparatus 203 re-executes the forming process (forging, machining, and the like) in the case where the inspection unit 211 of the control apparatus 204 determines that the structure can be repaired. Specifically, for example, the forming apparatus 203 machines a portion of the structure that is originally supposed to have been machined but that has not actually been machined. Accordingly, the structure manufacturing system 200 can form the structure accurately.

Although preferred embodiments according to the present invention have been described with reference to the appended drawings, it goes without saying that the present invention is not limited to these examples. The forms, combinations, and the like of the various constituent elements described in the aforementioned examples are merely examples, and many variations based on design requirements and the like are possible without departing from the essential spirit of the present invention.

For example, although exemplified in the aforementioned embodiments is the configuration in which the holding member 55 of the shape measuring apparatus 1 holds the optical probe 3 in a cantilever state, the present invention is not limited thereto, and the configuration may be such that the optical probe 3 is held on both sides thereof. Holding the optical probe 3 on both sides thereof makes it possible to reduce deformation arising from the rotation of the holding member 55, which in turn makes it possible to increase the measurement accuracy.

In addition, although the aforementioned embodiments have a configuration in which the shape information is measured in a state where the rotation axis line 53a is orthogonal to a plane that includes the first direction in which the illumination beam L emitted from the light source 12 travels and the second direction in which the illumination beam L reflected by the object M is incident on the image-forming optical system 21, the configuration may be such that, for example, depending on the surface shape of the object M, the shape information is measured in a state where the optical probe 3 has been rotated by a predetermined angle (90 degrees, as expressed by a difference between FIGS. 5 and 6, for example) around an axis parallel to the first holding section 55A of the holding member 55 after the optical probe 3 rotates around the rotation axis line 53a under the driving of the rotational driving unit 54, as illustrated in FIG. 8. In this manner, also employing the rotational operation of the optical probe 3 performed by the driving of the rotational driving unit 54 makes it possible to even better handle a variety of surface shapes of the object M.

Furthermore, although in the aforementioned embodiments, the optical probe 3 irradiates the object with line light and captures an image using the line light reflected by the object, the optical probe 3 is not limited to such a configuration. The illumination light emitted from the optical probe 3 may have a form in which an entire predetermined plane is irradiated at a time. For example, the method disclosed in U.S. Pat. No. 6,075,605 may be employed. The illumination light emitted from the optical probe may have a form in which a point-shaped spotlight is emitted.

The invention claimed is:

1. A shape measuring apparatus configured to measure a shape of a subject, the apparatus comprising:
   a probe including an irradiating optical system configured to irradiate the subject with light and an imaging element configured to detect light with which the subject is irradiated and which is reflected by the subject;
   a rotator configured to rotate the probe around the subject with the probe distanced from a rotation axis of the rotator;
   a holder disposed at a distance from a rotation axis of the rotator, the holder holding the probe and changing an attitude of the probe relative to the subject in accordance with the rotation of the probe;
   a calculator configured to calculate shape information of the subject using a signal detected from the imaging element using the probe; and
   a corrector configured to correct the shape information of the subject based on a deformation of the holder.

2. The shape measuring apparatus according to claim 1, wherein
   line light that passes through the rotation axis is emitted as the light and the probe rotates around the rotation axis.

3. The shape measuring apparatus according to claim 1, wherein
   the rotator rotates the probe greater than or equal to 180° around the rotation axis.

4. The shape measuring apparatus according to claim 1, further comprising a mover configured to allow the rotator to move in any one of a first direction, a second direction orthogonal to the first direction, and a third direction orthogonal to a plane formed by the first and second directions.

5. The shape measuring apparatus according to claim 1, further comprising
   a motor configured to rotate about the rotation axis;
   an angle reader configured to read a rotation angle of the motor; and
   a holding member configured to rotate the holder in accordance with the rotation of the motor.

6. The shape measuring apparatus according to claim 5; wherein
   the holding member includes:
   a first member that is connected to the rotator and extends extending in a direction orthogonal to the rotation axis; and
   a second member that is connected to the first member, extends in a direction parallel to the rotation axis and holds the probe.

7. The shape measuring apparatus according to claim 1, wherein
   the corrector further includes a storage unit configured to store deformation information of the holding member that is based on an attitude of the holding member, and the corrector calculates the attitude of the holding member that is based on the rotation of the holding member and corrects the shape information of the subject using the deformation information stored in the storage unit on the basis of a result of the calculation.

8. The shape measuring apparatus according to claim 1, wherein
   the corrector includes a vibration detector configured to detect a vibration in the holding member; and
   the shape information of the subject is corrected on the basis of the vibration in the holding member detected by the vibration detector.

9. The shape measuring apparatus according to claim 1, further comprising a distance varying mechanism configured to vary a distance between the probe and the rotation axis.

10. The shape measuring apparatus according to claim 1, further comprising:
    a stage configured to hold the subject; and
    a mover configured to move the stage;
    the mover configured to allow the stage to move in any one of the first direction, the second direction orthogonal to the first direction, and the third direction orthogonal to the plane formed by the first and second directions, or enables the stage to rotate around first, second, and third axes.

11. A structure manufacturing system comprising:
    a forming apparatus configured to form a structure on the basis of design information regarding a shape of the structure;
    the shape measuring apparatus as defined in claim 1, configured to measure the shape of the structure formed by the forming apparatus; and
    a control apparatus configured to compare shape information indicating the shape of the structure measured by the shape measuring apparatus with the design information.

12. The shape measuring apparatus according to claim 1, wherein the deformation of the holder is a thermal deformation or a deformation due to humidity.

13. The shape measuring apparatus according to claim 1, wherein a holding position at which the holder holds the probe is separated away from the rotation axis of the rotator in a direction orthogonal to the rotation axis.

14. The shape measuring apparatus according to claim 1, wherein the holder holds the probe such that a holding position at which the holder holds the probe is not overlapped with the rotation axis as viewed in a direction along the rotation axis.

15. A stage system used in a shape measuring apparatus that measures a shape of a subject, the stage system comprising:
    a stage apparatus including:
    a rotator configured to cause a probe to rotate around the subject with the probe distanced from a rotation axis of the rotator, the probe including an irradiating optical system configured to irradiate the subject with light and an imaging element configured to detect light with which the subject is irradiated and which is reflected by the subject; and
    a holder disposed at a distance from a rotation axis of the rotator, the holder holding the probe and changing an attitude of the probe relative to the subject in accordance with the rotation of the probe; and
    a corrector configured to correct shape information of the subject on the basis of deformation of the holder,
    wherein a signal from the imaging element is detected using the probe, and
    wherein shape information of the subject is acquired using the detected signal.

16. The stage system according to claim 15, wherein a holding position at which the holder holds the probe is separated away from the rotation axis of the rotator in a direction orthogonal to the rotation axis.

17. The stage system according to claim 15, wherein the holder holds the probe such that a holding position at which the holder holds the probe is not overlapped with the rotation axis as viewed in a direction along the rotation axis.

18. A shape measuring method of measuring a shape of a subject, comprising:
    irradiating the subject with light emitted from a probe, receiving light reflected by the subject using an imaging element, detecting a signal from the imaging element using the probe, and acquiring shape information of the subject using the detected signal, the probe including an irradiating optical system configured to irradiate the subject with the light and the imaging element configured to detect the light with which the subject is irradiated and which is reflected by the subject;
    changing an attitude of the probe relative to the subject in accordance with rotation of the probe, the probe being held by a holder at a position distanced from a rotation axis on which the probe is rotated around the subject;
    rotating a probe around a subject using a rotator, with the probe distanced from a rotation axis of the rotator; and
    correcting shape information of the subject on the basis of deformation of the holder.

19. A structure manufacturing method comprising:
    forming a structure on the basis of design information regarding a shape of the structure;
    measuring the shape of the formed structure using the shape measuring method as defined in claim 18; and
    comparing shape information indicating the measured shape of the structure with the design information.

20. The shape measuring method according to claim 18, wherein a holding position at which the holder holds the probe is separated away from the rotation axis of the rotator in a direction orthogonal to the rotation axis.

21. The shape measuring method according to claim 18, wherein the holder holds the probe such that a holding position at which the holder holds the probe is not overlapped with the rotation axis as viewed in a direction along the rotation axis.

22. A non-transitory computer readable medium storing a program causing a computer to execute a method, the method comprising:
    controlling, by the computer, a shape measurement apparatus including:
        a probe including an irradiating optical system configured to irradiate the subject with light and an imaging element configured to detect light with which the subject is irradiated and which is reflected by the subject;
        a rotator configured to rotate the probe around the subject;
        a holder disposed at a distance from a rotation axis of the rotator, the holder holding the probe and changing an attitude of the probe relative to the subject in accordance with the rotation of the probe;
    rotating a probe around a subject with the probe distanced from a rotation axis of the rotator;
    detecting a signal from the imaging element using the probe;
    acquiring shape information of the subject using the detected signal; and
    correcting the shape information of the subject on the basis of deformation of the holder.

23. The non-transitory computer readable medium storing the program according to claim 22, wherein a holding position at which the holder holds the probe is separated away from the rotation axis of the rotator in a direction orthogonal to the rotation axis.

24. The non-transitory computer readable medium storing the program according to claim 22; wherein the holder holds the probe such that a holding position at which the holder holds the probe is not overlapped with the rotation axis as viewed in a direction along the rotation axis.

* * * * *